US012711233B2

(12) United States Patent
Harsoor et al.

(10) Patent No.: US 12,711,233 B2
(45) Date of Patent: Aug. 18, 2026

(54) RECOVERY OF COMPROMISED SNAPSHOTS

(71) Applicant: Cohesity, Inc., San Jose, CA (US)

(72) Inventors: Sharan Harsoor, Bengaluru (IN); Sheetal Venkatesh Yelimeli, San Jose, CA (US); Mukunda Madhab Gogoi, Vadodara (IN); Ravi Varanasi, Cupertino, CA (US); Shishir Dwivedi, Bangalore (IN); Devesh Manjhi, Bengaluru (IN)

(73) Assignee: Cohesity, Inc., Santa Clara, CA (US)

( * ) Notice: Subject to any disclaimer, the term of this patent is extended or adjusted under 35 U.S.C. 154(b) by 47 days.

(21) Appl. No.: 18/821,165

(22) Filed: Aug. 30, 2024

(65) Prior Publication Data

US 2026/0064844 A1 Mar. 5, 2026

(51) Int. Cl.
*G06F 21/56* (2013.01)

(52) U.S. Cl.
CPC ...... *G06F 21/568* (2013.01); *G06F 2221/033* (2013.01)

(58) Field of Classification Search
CPC ......................... G06F 21/568; G06F 2221/033
See application file for complete search history.

(56) References Cited

U.S. PATENT DOCUMENTS

| | | | |
|---|---|---|---|
| 7,624,443 | B2 | 11/2009 | Kramer et al. |
| 7,962,956 | B1 | 6/2011 | Liao et al. |
| 8,255,998 | B2 | 8/2012 | Claudatos et al. |
| 8,468,604 | B2 | 6/2013 | Claudatos et al. |
| 8,712,970 | B1 | 4/2014 | Sim-Tang |
| 8,965,850 | B2 | 2/2015 | Varadarajan |
| 9,558,072 | B1 | 1/2017 | Mam |
| 10,650,146 | B1 | 5/2020 | Gaurav et al. |
| 11,681,591 | B2 | 6/2023 | Kulaga et al. |

(Continued)

FOREIGN PATENT DOCUMENTS

| | | | |
|---|---|---|---|
| EP | 1907972 | B1 | 4/2012 |
| KR | 20060071306 | A | 6/2006 |
| WO | 2008150849 | A1 | 12/2008 |

OTHER PUBLICATIONS

Sutcliffe, "Recover from advanced malware attacks using the Snapshot feature—x360Sync", Axcient x360, Oct. 5, 2022, 14 pp., URL: https://help.axcient.com/176211-x360sync-administrator-faqs/115010486687-x360Sync-Recover-from-advanced-malware-attacks-using-the-Snapshot-feature.

(Continued)

*Primary Examiner* — Beemnet W Dada
(74) *Attorney, Agent, or Firm* — Shumaker & Sieffert, P.A.

(57) ABSTRACT

Techniques are described for recovery of compromised snapshots. An example method comprises identifying, by a data platform implemented by a computing system, a baseline snapshot from a plurality of snapshots of protected data, wherein the baseline snapshot comprises one or more files that each exhibits no indication of compromise; for each file in an anomalous snapshot of the plurality of snapshots, identifying, by the data platform, from one or more intermediate snapshots between the anomalous snapshot and the baseline snapshot in the plurality of snapshots, a clean version of the file; and storing, by the data platform, a clean snapshot comprising the respective clean versions of the respective files identified for the files in the anomalous snapshot.

16 Claims, 9 Drawing Sheets

702 — Identify a baseline snapshot from a plurality of snapshots of protected data 704 — For each file in an anomalous snapshot of the plurality of snapshots, identify from one or more intermediate snapshots between the anomalous snapshot and the baseline snapshot a clean version of the file 706 — Store a clean snapshot comprising the respective clean versions of the respective files identified for the files in the anomalous snapshot

(56) References Cited

U.S. PATENT DOCUMENTS

| | | | | |
|---|---|---|---|---|
| 12,495,053 | B2 * | 12/2025 | Annen | H04L 63/1466 |
| 2020/0319979 | A1 | 10/2020 | Kulaga et al. | |
| 2022/0100378 | A1 * | 3/2022 | Borate | G06F 21/568 |
| 2023/0325501 | A1 | 10/2023 | Chhetri et al. | |
| 2024/0045990 | A1 | 2/2024 | Boyer et al. | |

OTHER PUBLICATIONS

Wood, “Five ways AI is revolutionising the data backup industry”, Digitalisation World, Jun. 2024, 3 pp., Retrieved from the Internet on Nov. 18, 2024 from URL: https://m.digitalisationworld.com/blogs/57907/five-ways-ai-is-revolutionising-the-data-backup-industry.

Extended Search Report from counterpart European Application No. 24214789.0 dated Mar. 6, 2025, 8 pp.

* cited by examiner

RECOVERY OF COMPROMISED SNAPSHOTS

TECHNICAL FIELD

This disclosure relates to data platforms for computing systems.

BACKGROUND

Ransomware and other malware attacks pose a significant threat to organizations by encrypting or compromising critical data. Traditional recovery methods are manual, time-consuming, prone to errors, and require specialized expertise. This leads to substantial data loss, operational disruptions, and financial repercussions.

Snapshots are often used for quick recovery to a previous state or to create consistent backups without interrupting a system's operation, and snapshots therefore can be used for malware recovery. Snapshots can be taken of any object or collection of objects stored to memory and/or disk of a computing system, and snapshots may be saved as one or more files. Examples of snapshots include a file system snapshot, which is a point-in-time copy or representation of the entire file system or a specific subset of it. A snapshot captures the state of files and directories at a particular point in time, providing a snapshot of the file system's data as it existed at that specific point. The file system data can include file system objects (e.g., files, directories, etc.), metadata, or both. Snapshots may also be taken of executing application workloads, such as virtual machines, groups of one or more containers, or bare metal processes. For example, a virtual machine snapshot captures the state of an executing virtual machine at a specific point in time and typically involves saving the virtual machine's virtual disks, memory state, configuration data, and virtual machine snapshot metadata as multiple different files, often with corresponding file types and formats.

The primary issue with traditional malware—particularly ransomware—recovery methods is their inefficiency and risk. Traditional recovery processes are heavily reliant on human intervention, making these processes time-consuming and prone to errors. Restoring entire snapshots is a blunt approach that often includes compromised data.

SUMMARY

Aspects of this disclosure describe techniques for identifying clean files within compromised snapshots to recover a snapshot. The techniques may include using Artificial Intelligence (AI) to identify the clean files. Snapshots that represent object states relatively later in time will better represent the present state of the object being protected, for intended updates are being captured in subsequent snapshots. Ransomware and other malware often infect files incrementally, i.e., by infecting various files over time rather than all at once, to avoid triggering an alert. Accordingly, malware that is infecting files included in stored snapshots also typically infect the files from different snapshots incrementally. It is therefore common for different snapshots to have different sets of infected files. However, current approaches toward snapshot recovery require a snapshot to exhibit no anomalies or indicators of compromise (IOCs) in any of the snapshot files for that snapshot to be considered a candidate snapshot for recovery.

Rather than relying on isolated security features, such as ransomware detection, data classification, or support from security platforms and various data security posture management (DSPM) providers, a data platform according to the described techniques may analyze file metadata, content, and behavior patterns to differentiate between clean and infected snapshot files and thereby enable a fine-grained approach to snapshot recovery. Instead of relying on a single snapshot, the data platform may examine several snapshots to increase the probability of finding clean files and of finding such clean files in more recent snapshots. Identified clean files, which can be located in different snapshots, may be used for recovery and may be recovered in a secure, isolated environment (i.e., a clean room) to prevent further contamination. This facilitates the integrity of the recovered data.

In some examples, by automating the process, a data platform may significantly reduce recovery time compared to manual methods. Additionally, the use of AI may improve accuracy in identifying clean files, reducing data loss compared to existing, manual approaches and approaches that rely on the blunt approach of identifying a snapshot entirely devoid of infection to be used for recovery. In some examples, an AI-based chatbot may provide user-friendly interaction and may collect feedback for improvement.

The techniques of this disclosure may provide one or more technical advantages that realize one or more practical applications. As noted above, an automated process may speed up the recovery process, reducing business downtime. AI-driven and individuated identification of clean files in different snapshots may reduce data loss by applying a preference for clean objects identified in more recent snapshots. Automation may lead to cost savings by reducing the need for specialized personnel. Recovery in a clean room environment may protect recovered data from further compromise.

Although the techniques described in this disclosure may be described with respect to a snapshot function of a data platform, similar techniques may be applied for a backup or archive function or other data protection function provided by the data platform. In some examples, the techniques described herein may be used to provide a security response for application or other workloads including those related or unrelated to a snapshot, backup, or archive.

In one example, this disclosure describes a method comprising identifying, by a data platform implemented by a computing system, a baseline snapshot from a plurality of snapshots of protected data, wherein the baseline snapshot comprises one or more files that each exhibits no indication of compromise; for each file in an anomalous snapshot of the plurality of snapshots, identifying, by the data platform, from one or more intermediate snapshots between the anomalous snapshot and the baseline snapshot in the plurality of snapshots, a clean version of the file; and storing, by the data platform, a clean snapshot comprising the respective clean versions of the respective files identified for the files in the anomalous snapshot.

In another example, this disclosure describes computing system comprising: a memory storing instructions; and processing circuitry that executes the instructions to: identify a baseline snapshot from a plurality of snapshots of protected data, wherein the baseline snapshot comprises one or more files that each exhibits no indication of compromise; for each file in an anomalous snapshot of the plurality of snapshots, identify from one or more intermediate snapshots between the anomalous snapshot and the baseline snapshot in the plurality of snapshots, a clean version of the file; and store a clean snapshot comprising the respective clean versions of the respective files identified for the files in the anomalous snapshot.

In yet another example, this disclosure describes non-transitory computer-readable media comprising instructions that, when executed, cause processing circuitry of a computing system to: identify a baseline snapshot from a plurality of snapshots of protected data, wherein the baseline snapshot comprises one or more files that each exhibits no indication of compromise; for each file in an anomalous snapshot of the plurality of snapshots, identify from one or more intermediate snapshots between the anomalous snapshot and the baseline snapshot in the plurality of snapshots, a clean version of the file; and store a clean snapshot comprising the respective clean versions of the respective files identified for the files in the anomalous snapshot.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
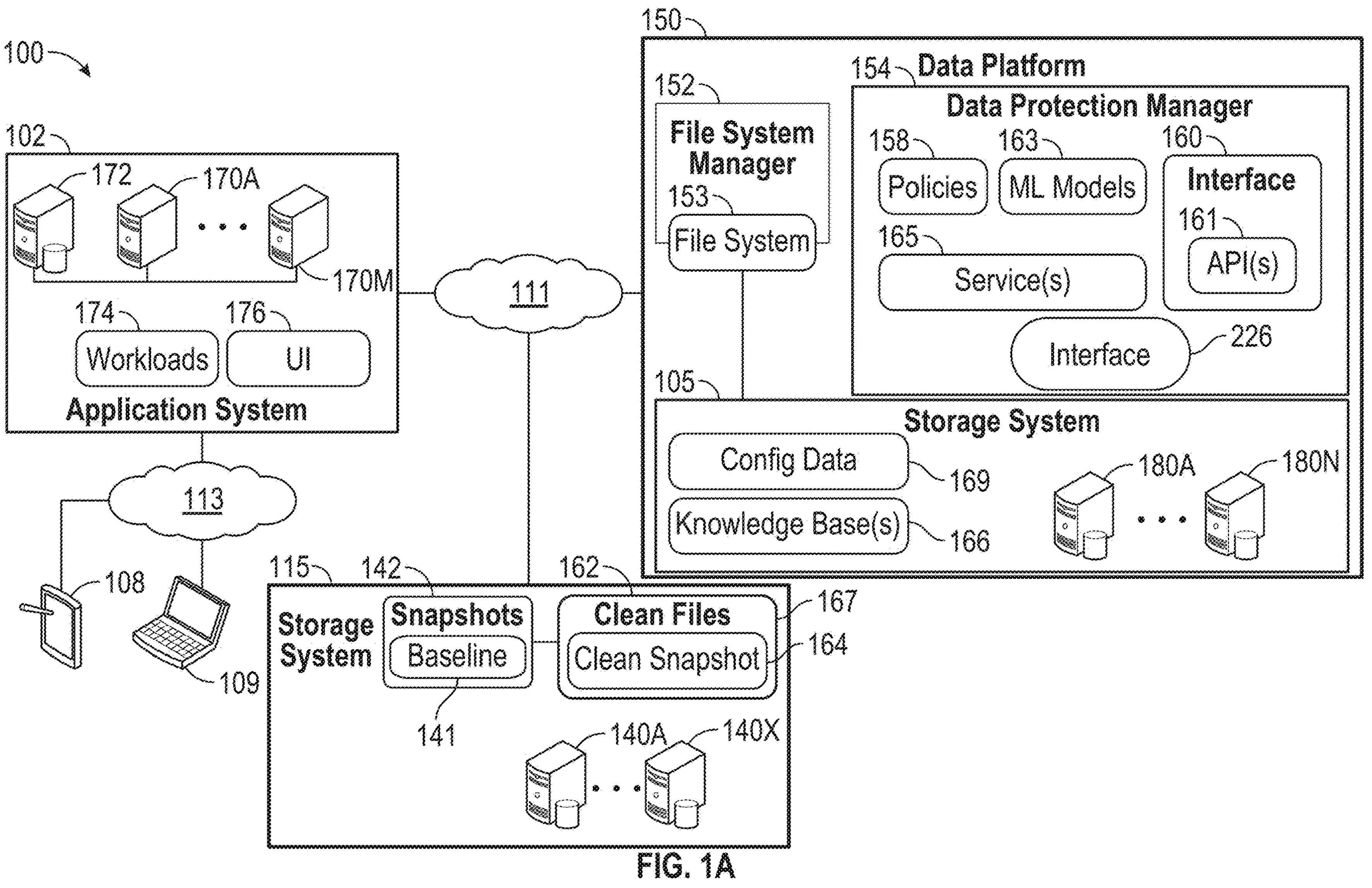
FIG. 1A-1B are block diagrams illustrating example systems configured to support malware recovery, in accordance with one or more aspects of the techniques described in this disclosure.
Figure 1B:
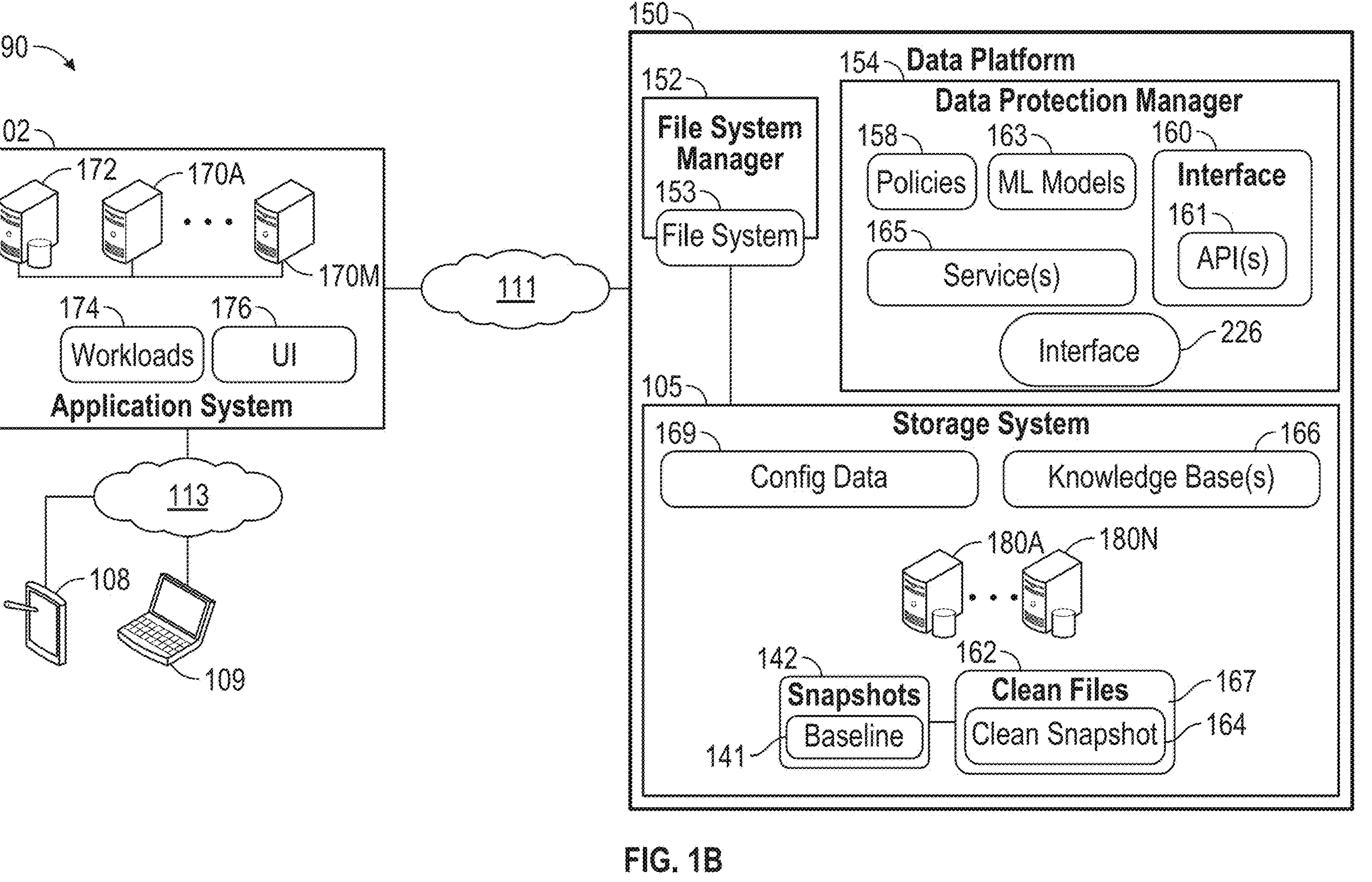

FIG. 1A-1B are block diagrams illustrating example systems configured to support malware recovery, in accordance with one or more aspects of the techniques described in this disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, groups of one or more containers (e.g., Kubernetes pods), bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON® Simple Storage Service (S3®). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and data protection manager 154 in the example of system 100. In some examples, separate compute devices (not shown) execute software for data platform 150, such as file system manager 152 and data protection manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Snapshots 142 or archives created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 111 or network 113 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1A-1B may be operatively coupled to network 111 and/or network 113 using one or more network links. The links coupling such devices or systems to network 111 and/or network 113 may be Ethernet, Asynchronous Transfer Mode (ATM) or other types of network connections, and such connections may be wireless and/or wired connections. One or more of the devices or systems illustrated in FIG. 1A-1B or otherwise on network 111 and/or network 113 may be in a local location and/or a remote location relative to one or more other illustrated devices or systems.

Application system 102, using file system 152 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. As shown in the example of FIG. 1A for instance, storage system 105 may store metadata for file system 153 in a tree data structure. Objects that are stored may include files, databases, applications, workloads 174, system images, directory information, or other types of objects used by application system 102. Objects of different types and objects of a same type may be deduplicated with respect to one another.

Data platform 150 includes data protection manager 154 that provides one or more data protection functions for application system 102, such as backups or snapshots of file system data for file system 153, workloads 174, operating systems, databases of database server 172, or of servers 170, 172. Hereinafter, this disclosure will refer to snapshots 142, but the techniques are applicable to other aforementioned data protection functions. In the example of system 100, data protection manager 154 stores one or more snapshots 142 of application system 102 data to storage system 115 via network 111. Application system 102 data may be, e.g., file system data stored to storage system 105 or data that is local to application system 102, workloads 174, operating systems, databases of database server 172, or of servers 170, 172, or other operational, configuration, or other data relating to application system 102.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support use cases such as backup, snapshot, and archive. In general, each of snapshots 142 is a copy of application system 102 data created by data protection manager 154 to support quick recovery, often due to some data loss or compromise in file system 153 or application system 102. A file system archive ("archive") is a copy of file system 153 to support longer term retention and review. The "copy" may include such data as is needed to restore or view file system 153 or other application system 102 data in its state at the time of the snapshot, backup, or archive.

Data protection manager 154 may backup or snapshot data at any time in accordance with policies 158 that specify, for example, periodicity and timing (daily, weekly, etc.), which data is to be backed up, a retention period, storage location, access control, and so forth. An initial snapshot of file system data corresponds to a state of the data at an initial time (the creation time of the initial snapshot). The initial snapshot may include all data or may include less than all of the data, in accordance with policies 158. For example, the initial backup/snapshot may include all objects of file system 153 or one or more selected objects of file system 153, some of workloads 174, all of workloads 174, or portions thereof.

One or more subsequent incremental backups/snapshots of the file system 153 may correspond to respective states of the data at respective subsequent creation times, i.e., after the creation time corresponding to the initial backup/snapshot. A subsequent backup/snapshot may correspond to an incremental backup of one or more objects of file system 153, workloads 174, or other data relating to application system 102. Some of the file system data for file system 153 stored on storage system 105 at the initial creation time for a backup/snapshot may also be stored on storage system 105 at the subsequent backup/snapshot creation times. A subsequent incremental backup/snapshot may include data that was not previously stored at storage system 115. Data that is included in a subsequent backup/snapshot may be deduplicated by data protection manager 154 against data that is included in one or more previous backups/snapshots, including the initial backup/snapshot, to reduce the amount of storage used. (Reference to a "time" in this disclosure may refer to dates and/or times. Times may be associated with dates. Multiple backups/snapshot may occur at different times on the same date, for instance.)

In system 100, data protection manager 154 stores snapshots of application system 102 data to storage system 115 as snapshots 142. (In some examples, data protection manager 154 also or alternatively stores backups to storage system 115.) Data protection manager 154 may use any of snapshots 142 to subsequently restore the application system 102 data to its state at the snapshot creation time. As noted above, data protection manager 154 may deduplicate data included in a subsequent snapshot against data that is included in one or more previous snapshots. For example, a second object of file system 153 included in a second snapshot may be deduplicated against a first object of file system 153 and included in a first, earlier snapshot. Similarly, a first workload 174 included in a second snapshot may be deduplicated against an earlier version of first workload 174 and included in a first, earlier snapshot.

Data protection manager 154 may apply deduplication as part of a write process of writing (i.e., storing) a data to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

An end user or application may have access (e.g., read or write) to data that is stored in storage system 115. The application may execute on application system 102, data platform 150, or other system. The end user or application may delete some of the data due to a malicious attack (e.g., virus, ransomware, etc.), a rogue or malicious administrator, and/or human error. The user's credentials may be compromised and as a result, the data that is stored in storage system 115 may be subject to ransomware. To reduce the likelihood of accidental or malicious data deletion or corruption, a data lock having a data lock period may be applied to a snapshot.

Data protection manager 154 may apply security services in the form of security services 165 ("services 165") that analyze file system 153, snapshots 142, application system 102, etc., to identify security breaches, including one or more of a ransomware attack, a malware attack, an unauthorized data access, and a presence of malicious code. Services 165 may each be implemented using one or more microservices, workloads, or other executable instance. Services 165 may each provide a dedicated security analysis function that allows the end user to perform keyword searches in an attempt to summarize security breaches identified by the respective one of services 165. This results in the end user having to enter, via interface 160 of data platform 150, keyword searches specific to the underlying one of services 165, which may require dedicated end user understanding of each one of services 165. As a result, the end user may often have to perform multiple keyword searches and manually summarize security breaches, which frustrates end users and may result in the end user contacting support staff for data platform 150. The end user may waste computing resources both locally (e.g., at application system 102) and at data platform 150 attempting to better understand the security breaches impacting file system 153 or application system 102 (e.g., especially in the form of ransomware, which may lock files stored to snapshots 142 and prevent successful restores of snapshots 142).

Workloads 174 may include one or more virtual machines (VMs) which may be subject to ransomware or other malicious attacks. In accordance with various aspects of the techniques described in this disclosure, data protection manager 154 may create a clean, functional VM by recovering files from multiple snapshots 142. Data protection manager 154 may recover the files using a safe environment, i.e., one of clean rooms 167. The process may be designed to counteract ransomware or other malicious attacks that may have compromised one or more of workload 147, file system 153, or snapshots 142.

Data protection manager 154 may start the process by identifying a snapshot from snapshots 142 that is definitively free from any signs of compromise. This clean baseline snapshot 141 may serve as a foundation for the reconstruction. In some examples, instead of restoring an entire snapshot, the data protection manager 154 may carefully select files from subsequent snapshots 142, ensuring they are clean and free from malicious alterations. Such a fine-grained approach may reduce the risk of reintroducing threats.

With the recovered clean files 162, the data protection manager 154 may construct a new, deployable VM. This VM should be identical to the original VM before the attack, minus the malicious components. By selectively recovering clean files 162 up to the current snapshot to restore a clean state, the data protection manager 154 may significantly reduce the risk of restoring compromised data. For example, recovering only necessary clean files 162 may save time and resources compared to restoring entire snapshots 142. The data protection manager 154 may aim for a precise reconstruction of the pre-attack state of the VM, such as the states of virtual disks, memory state, and/or configuration data. By eliminating malicious components, the reconstructed VM may be less susceptible to future attacks.

Snapshots 142 include many snapshots from many different points in time. As used, herein snapshots S (which may be one or more of snapshots 142) each includes one or more files that store data for the protected data. Snapshots may be fully or partially hydrated, where "hydration" is the process of converting a non-fully-hydrated snapshot (often a thin, space-efficient representation of data) into a full, usable dataset. This typically involves "filling in" the snapshot with the actual data it represents, making it a complete and fully accessible copy of the data at a particular point in time.

For a VM snapshot, each snapshot can include separate files to save the virtual machine's virtual disks, memory state, configuration data, and virtual machine snapshot metadata. As used herein, the term "Snapshot S[N]" for a snapshot recovery operation represents the most recent snapshot in which an anomaly or irregularity has been identified. The snapshot S[N] may be the starting point for the recovery process for the protected data. As used herein, the term "files F[N]" refers to the complete set of files contained within the snapshot S[N]. Files F[N] may include all files, both clean files 162 and affected.

As used herein, the term "affected files M[N]" refers to a subset of F[N] that consists of files that have been compromised by ransomware or other malicious activities. The compromised files are those that exhibit signs of tampering, such as, but not limited to, modified content, altered extensions, or the presence of Indicators of Compromise (IOCs). As used herein, the term "clean files" 162 refers to files within F[N] that have not been affected by malicious activity and remain intact. Clean files 162 may be the primary targets for recovery.

As used herein the term "baseline snapshot" refers to a reference point, a snapshot taken at a time when the file system 153 was known to be clean and free from any ransomware or malicious influence. Baseline snapshot 141 may serve as a benchmark for comparison and recovery. Clean snapshot 164 may represent a restored uncompromised version of a VM.

Figure 3:
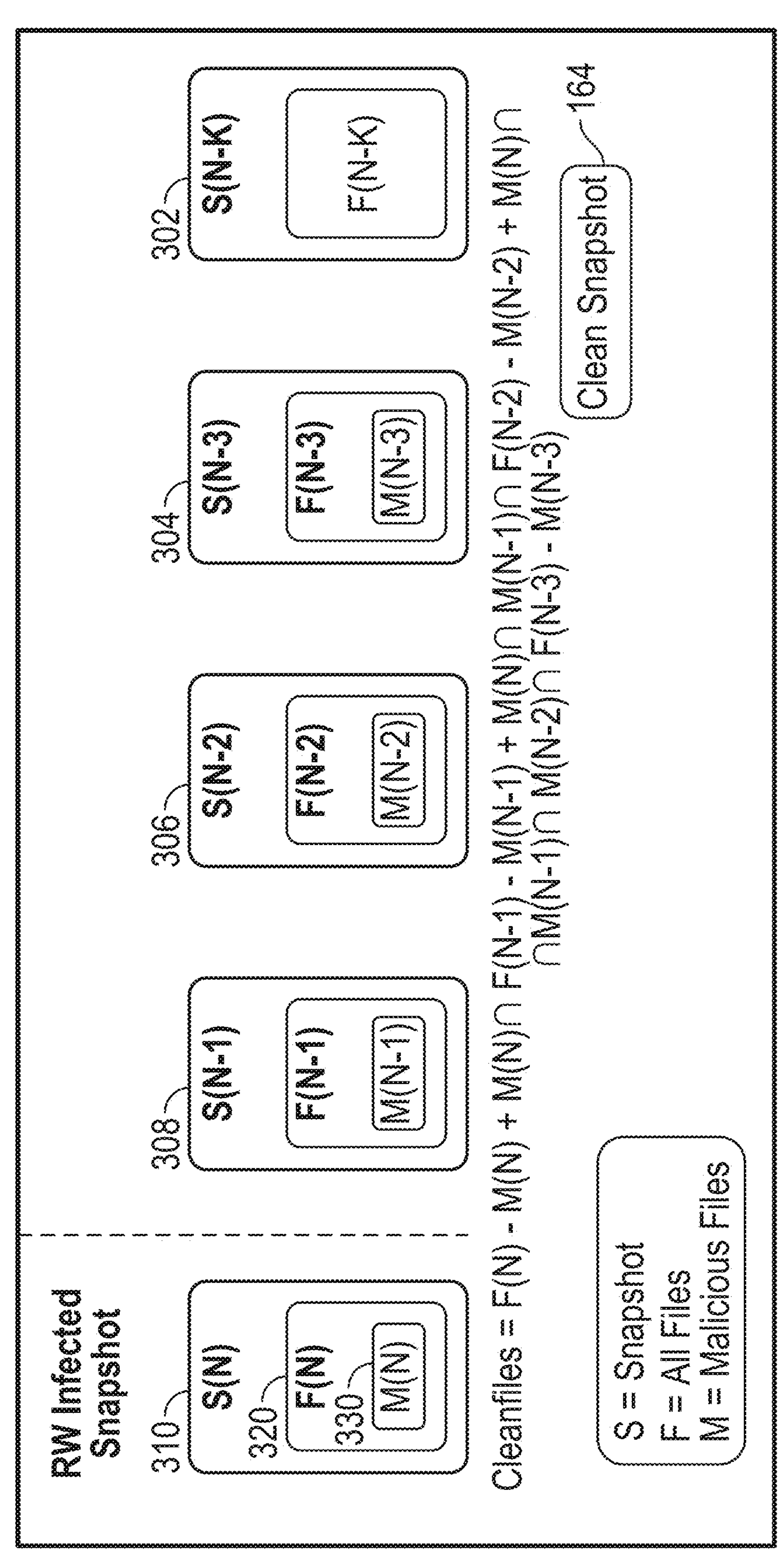
FIG. 3 is a block diagram illustrating an example of a plurality of snapshots that may be used construct a clean snapshot, in accordance with techniques of this disclosure.
Figure 4:
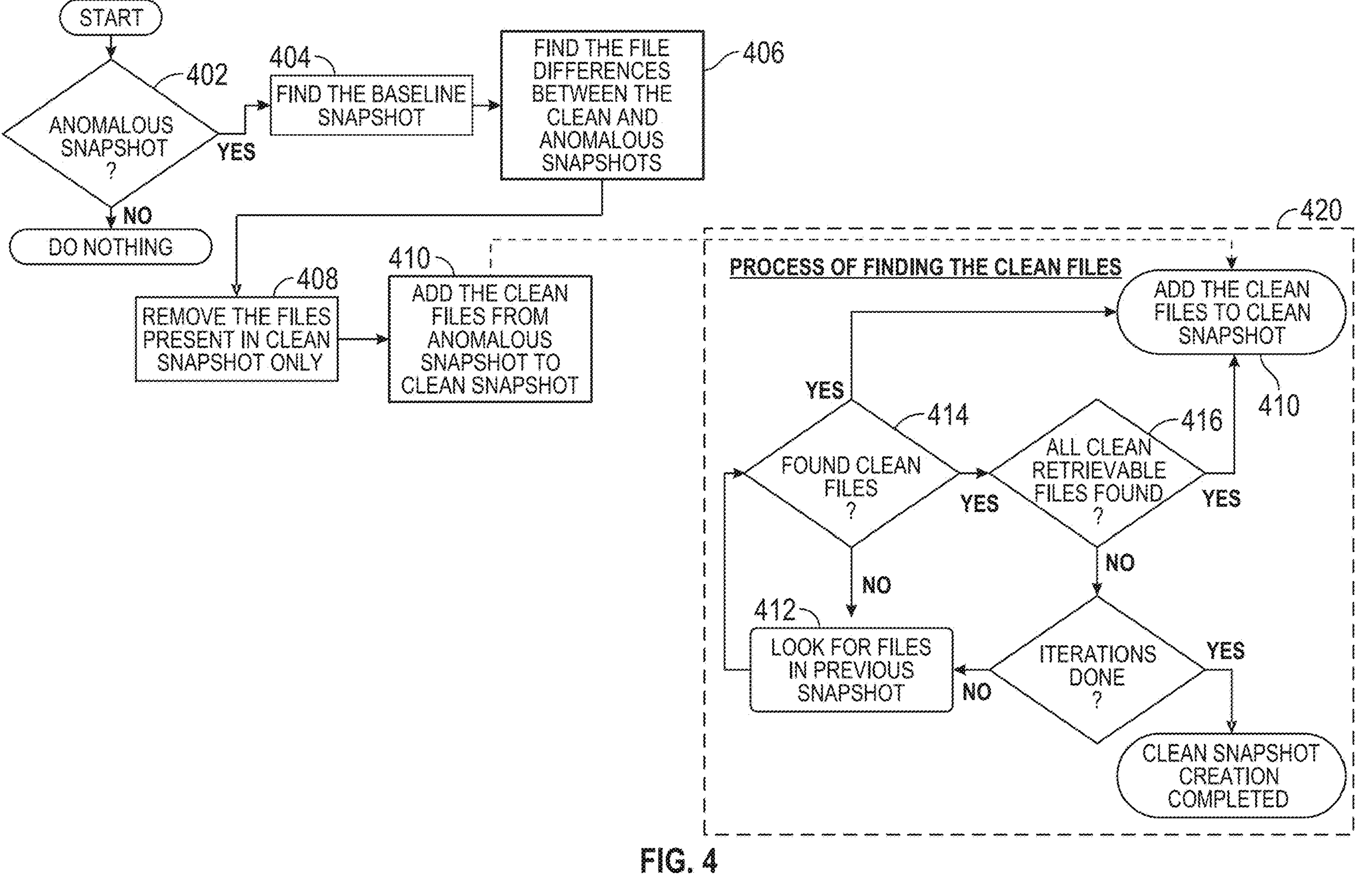
FIG. 4 is a flowchart illustrating example operation of a data protection manager in performing various aspects of construction of a clean snapshot, in accordance with techniques of this disclosure.

The aforementioned terms establish a framework for understanding the malware recovery process. By identifying affected files and a clean baseline 141, the data protection manager 154 may focus on recovering clean files 162 to reconstruct a healthy system state into a clean snapshot 164. The disclosed techniques may be more precise than restoring entire snapshots 142, as the disclosed techniques avoid reintroduction of compromised data. FIG. 3-4, described below, illustrate an example process for identifying clean files in a set of snapshots in order to reconstruct a clean snapshot for use in recovery of the protected data.

In accordance with various aspects of the techniques described in this disclosure, data platform 150 may support execution of an AI "bot" that may rely on one or more machine learning (ML) models 163 ("ML models 163") (e.g., decision tree, clustering, linear regression, Naïve Bayes, k nearest neighbors (kNN)). ML models 163 may be trained with respect to various knowledge bases 166, including a general security knowledge base, a secure environment knowledge base (e.g., access controls data, encryption mechanisms, data loss prevention mechanisms), a VM criticality knowledge base, a data platform security specific knowledge base (e.g., documentation regarding security services provided by the data platform), account-specific security knowledge base (e.g., logs and/or other data reflective of security breaches for a specific account associated with an end user), and other security adjacent knowledge bases. The security knowledge bases may include user or other actions at network, compute, or other electronic system and identifications of security breaches that, when used to train the ML model 163, allow the ML model 163 to streamline the ransomware recovery. As described herein, the bot may be implemented in data platform 150 in the form of interface 226 and may be referred to as interface 226.

In accordance with various aspects of the techniques described in this disclosure, data platform 150 may support execution of a bot that may streamline the ransomware recovery process by automating the configuration of clean rooms 167. Traditionally, users would need to manually switch between different recovery environments or contexts. The disclosed bot techniques may eliminate this manual intervention, enhancing user experience and efficiency. Clean rooms 167 represent one or more clean room environments. A clean room is typically used as a secure, isolated environment used to analyze, identify, and recover from malware infections without the risk of further spreading the malware or causing additional damage in the system. Clean rooms 167 may be implemented using a separate, disconnected network (an air-gapped system) or virtual machines that are not connected to data platform 150.

Data protection manager 154 may include ML model 163 in the form of a large language model (LLM) that may reference one or more knowledge bases 166 in various ways to obtain configuration data 169 (either general, specific, and/or clean room-specific) that may form the basis of natural language messages, summaries, explanations, or descriptions for configuring clean rooms 167 for the user and natural language responses to natural language queries entered by the end user. LLM 163 may be executed by data platform 150 or on a third-party platform. In some examples, data protection manager 154 may apply the LLM (which is an example of ML models 163 and may be referred to as "LLM 163") to interact with the user, such as to prompt the user for information or to confirm an action (e.g., configuration response). The prompt is an "actionable prompt" in that data protection manager 154 may perform the action in response to confirmation (e.g., user input approving deletion of a clean room 167) from the user. In some examples, data protection manager 154 receives user input (e.g., approval, permission, or confirmation) prior to executing any actions to ensure no actions are taken without user approval.

In some examples, interface 226 may automatically analyze the specific ransomware attack, the type of data affected, and the desired recovery objectives. Based on this information, interface 226 may automatically set up the environment of the clean room 167.

The user may interact with interface 226 using natural language (e.g., voice-to-text, text chat messages, etc.) to enter queries, commands and other information, which interface 226 may process using one or more ML models 163 to derive configuration. Based on the configuration, data protection manager 154 may retrieve security and/or configuration data 169 from one or more of a general security knowledge base, a general configuration knowledge base, a data platform specific knowledge base, an account-specific configuration knowledge base, or other security adjacent knowledge bases (shown as knowledge base(s) 166). Data protection manager 154 may invoke LLM 163, providing derived configuration, monitored actions, security analysis outputs from services 165, the security data retrieved from various knowledge bases 166, or various subsets thereof.

LLM 163 may formulate, based on such input, a natural language response. For example, LLM 163 may provide a user-friendly interface that allows users to monitor the recovery process and make adjustments as needed, without the need to delve into complex configuration settings. LLM 163 may include one or more suggested actions (e.g., configuration settings) for the user to confirm or describe one or more actions interface 226 has already taken for setting up a clean room with which to create clean files 162. LLM 163 may formulate, based on such input, a natural language response. Interface 226 executed by the data platform 150 may then output the natural language response from LLM 163. In some examples, interface 160 may provide one or more APIs 161 and other systems may make API calls (e.g., requests) to interface 226 to allow a user to interact with data platform 150 using natural language.

Data protection manager 154 may process the snapshots 142, such as through a data security ML model of ML models 163 (which is an example of ML models 163 and may be referred to as "data security model 163") to detect a security breach (or potential security breach), a compromise (or a potential compromise) of a snapshot 142, workload 174, components or data of application system 102, file system 153 data, or a collection of files., or both. Data security model 163 may be trained to detect a security breach or a compromise with respect to various knowledge bases 166, including a general security knowledge base, a data platform security specific knowledge base (e.g., documentation regarding security services provided by the data platform), account-specific security knowledge base (e.g., logs and/or other data reflective of security breaches for a specific account associated with an end user), and other security adjacent knowledge bases. For example, data security model 163, in response to receiving an indication of a security breach, may determine whether a snapshot of snapshots 142 has been compromised, as will be described further below.

In some examples, data protection manager 154 may employ a VM criticality ML model of ML models 163 (which is an example of ML models 163 and may be referred to as "VM criticality model 163"), which may be trained to provide accurate VM criticality assessment. The accurate VM criticality assessment may help prioritize the recovery process and resource allocation. Identifying critical VMs may help data protection manager 154 to focus security efforts on high-value assets.

As noted above, complex user interfaces and convoluted business processes often lead to user frustration and decreased productivity. Users frequently rely on extensive documentation and tutorials to navigate systems effectively, which may be time-consuming and inefficient. By introducing a bot (interface 226), organizations may simplify user interactions and automate task setup. For example, interface 226 may provide a more natural and conversational way for users to interact with the data platform 150.

Interface 226 may handle the complex task of switching between different recovery contexts, ensuring that the clean room 167 environment is isolated and secure. Interface 226 may optimize resource allocation within the clean room 167, such as, but not limited to, storage, compute power, and network connectivity, based on the recovery requirements. Interface 226 may save time and may reduce errors associated with manual configuration.

The simplified process may make ransomware recovery more accessible to users with varying technical expertise. By automating the process, the risk of human error leading to security breaches may be reduced. Interface 226 may ensure that resources are allocated efficiently for the recovery process.

For example, in a scenario where ransomware is detected on one of the workloads 174, interface 226 t, upon detection, may break down complex tasks into simpler steps, making the process easier for users. Interface 226 may provide real-time assistance, eliminating the need for users to constantly refer to manuals. A more streamlined and intuitive user experience may lead to increased satisfaction and productivity. Interface 226 may simplify the complex task of configuring clean rooms 167. The interaction with interface 226 should be intuitive and easy to understand, even for users without technical expertise.

This dynamic, interactive process not only ensures that users may interact with interface 226 using simple, natural language commands to create, modify, or delete clean rooms 167, thereby enhancing security measures and configuration without the need for manual intervention. Interface 226 represents a significant advancement in security management in that interface 226, based on user input, may automatically set up the necessary infrastructure, resources, and security parameters. In some examples, interface 226 may implement a chat bot or a virtual assistant.

System 190 of FIG. 1B is a variation of system 100 of FIG. 1A in that data platform 150 stores snapshots 142 to snapshot storage system 105 that resides on premises or, in other words, local to data platform 150. In some examples of system 190, storage system 105 enables users or applications to create, modify, or delete clean snapshots 164 via file system manager 152. In system 190, storage system 105 of FIG. 1B is the local storage system used by data protection manager 154 for initially storing and accumulating snapshots 142. Data protection manager 154 may store tree data comprising nodes with references (e.g., pointers) to one or more clean files 162 at storage system 105.

Figure 2:
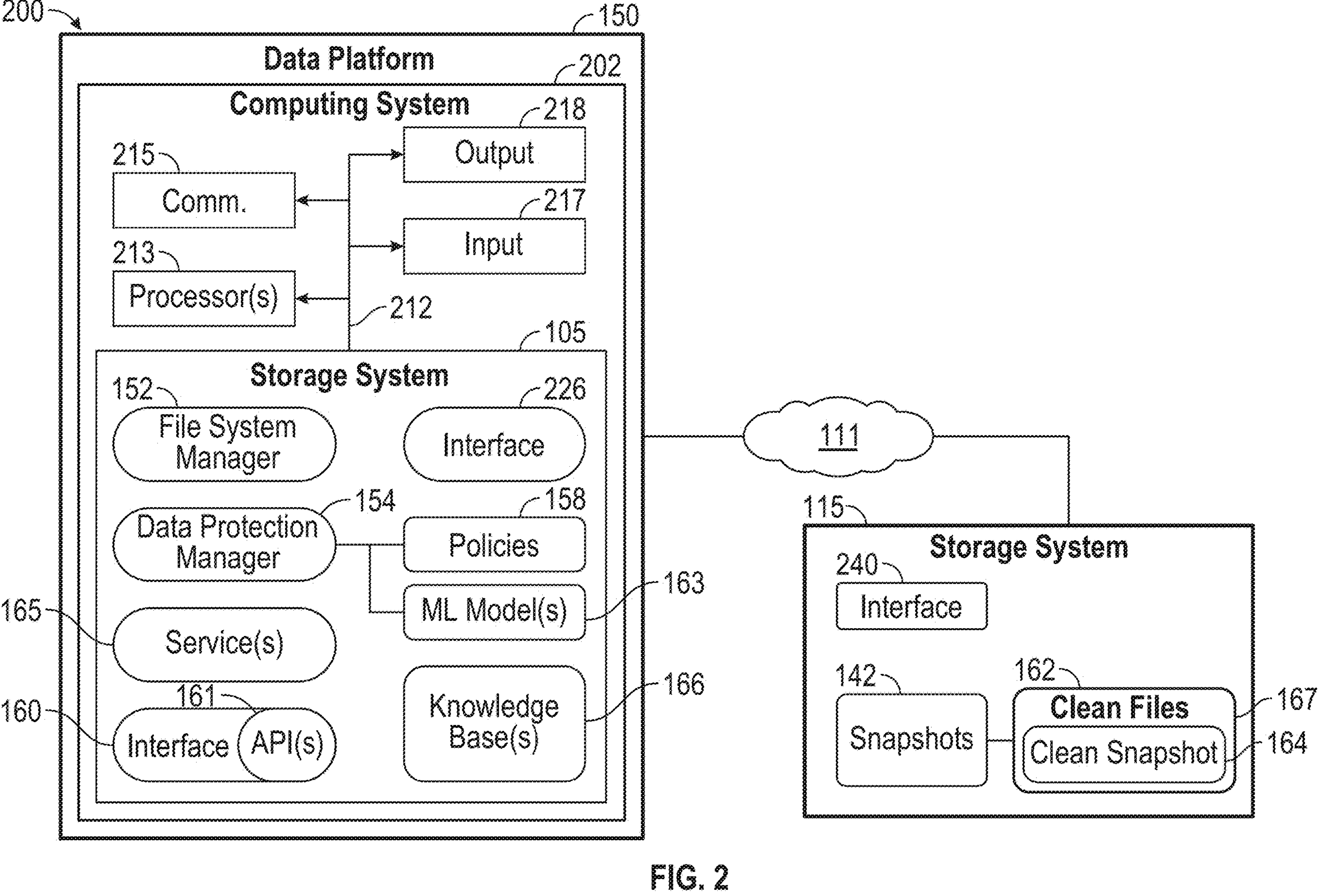
FIG. 2 is a block diagram illustrating an example system configured to support malware recovery, in accordance with techniques of this disclosure.

FIG. 2 is a block diagram illustrating an example system configured to support malware recovery, in accordance with techniques of this disclosure. System 200 of FIG. 2 may be described as an example or alternate implementation of system 100 of FIG. 1A or system 190 of FIG. 1B (where snapshots 142 are written to a local snapshot storage system 115). One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one snapshot storage system 115 is depicted, data platform 150 may apply techniques in accordance with this disclosure using multiple instances of snapshot storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 may include interface module 226, file system manager 152, ML model(s) 163, and policies 158 as well as data protection manager 154 and services 165. Local storage system 105 may also include knowledge base(s) 166 as well as interface 160 and API(s) 161. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata for structuring file system data for file system 153, and store file system metadata and file system data to local storage system 105. File system metadata may include one or more trees that describe objects within file system 153 and the file system 153 hierarchy, and can be used to write or retrieve objects within file system 153. File system manager 152 may interact with and/or operate in conjunction with one or more modules of computing system 202, including interface module 226 and data protection manager 154.

Data protection manager 154 may perform functions relating to execution of ransomware recovery by implementing a recovery process, as described above with respect to FIG. 1A, including operations described above with respect to ML models 163, such as VM criticality model 163 and LLM 163 described above, interface 226, interface 160 and services 165. Data protection manager 154 may cause storage system 105 to store, retrieve, and update knowledge bases 166. For example, data protection manager 154 may cause storage system 105 to store, retrieve, and update knowledge bases 166 during training of and inferencing by ML models 163.

Data protection manager 154 may generate one or more snapshots 142 and cause file system data to be stored as tree data within snapshots 142 in snapshot storage system 115. Data protection manager 154 may generate and manage the tree data for generating, viewing, retrieving, or restoring any of snapshots 142. Data protection manager 154 may generate and manage file system metadata for generating, viewing, retrieving, or restoring objects, such as VMs, for any of snapshots 142. In some examples, VMs may be restored in secure and isolated environments (clean rooms 167).

Local storage system 105 may store one or more clean rooms 167. The clean room 167 may include a plurality of verified clean files 164 that may be used to generate a clean snapshot 164 by incorporating verified clean files 167. In some examples, the data protection manager 154 may automatically analyze the specific ransomware attack, the type of data affected, and the desired recovery objectives. Based on this information and based on interaction with a user, data protection manager 154 may automatically set up the environment of the clean room 167. If multiple clean rooms exist, data protection manager 154 may present a list of options for the user to select. If no clean rooms are configured, data protection manager 154 may prompt the user to register a new one before initiating recovery.

Local storage system 105 may include configuration data 169 that may describe requirements for respective clean rooms 167 on storage system 115, along with other metadata about the snapshots, such as a checksum, encryption data, compression data, etc. In FIG. 2, data protection manager 154 causes file system metadata to be stored to local storage system 105. In some examples, data protection manager 154 causes some or all of file system metadata to be stored to snapshot storage system 115. Data protection manager 154, optionally or in conjunction with file system manager 152, may use file system metadata to restore any of snapshots 142 to clean snapshot 164 of a clean room 167 implemented by data platform 150, which may be presented by file system manager 152 to other systems.

Interface module 226 may execute an interface by which other systems or devices may determine operations of file system manager 152 or data protection manager 154. Another system or device may communicate via an interface of interface module 226 to specify one or more policies 158.

System 200 may be modified to implement an example of system 190 of FIG. 1B. In the modified system 200, snapshots 142 may be stored to a local snapshot storage system 115.

Interface module 240 of snapshot storage system 115 may execute an interface by which users may create, modify, or delete one or more clean rooms 167 for restoring clean snapshots 164. Interface module 240 may execute and present an API. The interface presented by interface module 240 may be a gRPC, HTTP, RESTful, command-line, graphical user, web, or other interface.

FIG. 3 is a block diagram illustrating an example of a plurality of snapshots that may be used construct a clean snapshot, in accordance with techniques of this disclosure. Various aspects of FIG. 3 are described below in the context of FIG. 1A-1B. FIG. 3 depicts multiple read-write (RW) snapshots, some of which have malicious files and are thus considered infected. As shown in the example of FIG. 3, data protection manager 154 may identify the last (i.e., most recent) clean snapshot (S[N−K]) 302 that is represented as baseline snapshot 141 in FIGS. 1A-1B and 2. As described above, this step may involve a backward-looking analysis of snapshots from anomalous snapshot 310 to pinpoint a clean starting point (baseline snapshot 302). As such, in some examples, the anomalous snapshot S[N] 310 may represent a snapshot suspected to be compromised. Anomalous snapshot S[N] 310 may be a most recent snapshot suspected to be compromised. Data protection manager 154 may continue the process by examining the previous snapshot, S[N−1] 308. In some examples, data protection manager 154 may continue this examination sequentially through older snapshots 306, 304 until baseline snapshot 302 is found that is free from anomalies, Indicators of Compromise (IOCs), or any other signs of compromise. This baseline snapshot 302 may be designated as S[N−K], where K represents the number of snapshots between the anomalous snapshot 310 and the baseline one 302.

In the example of FIG. 3, once the baseline snapshot 302 is determined, the data protection manager 154 may shift the focus to reconstructing a clean version of the protected data. Data protection manager 154 may check each file 320 present in the anomalous snapshot 310 for its existence in the baseline snapshot 302. If a file exists in both snapshots, data protection manager 154 may further examine all intermediate snapshots 304-308 to ensure the file remains unaltered and free from anomalies or IOCs. Files that appear in snapshots after baseline snapshot 302 but before anomalous snapshot 310 may be scrutinized in each snapshot up to anomalous snapshot 310 to verify their integrity and legitimacy.

In the example of FIG. 3, the combined steps performed by data protection manager 154 may aim to recover a snapshot for data, such as a VM, to a clean state. Data protection manager 154 may identify a point in time (baseline snapshot 302) when the snapshot was known to be clean (uncompromised). Data protection manager 154 may verify the integrity of files from that clean point to the present.

In some examples, with a list of verified clean files from baseline snapshot 302 up to anomalous snapshot 310, the final step performed by data protection manager 154 may be to create a clean snapshot that excludes any compromised files. For example, data protection manager 154 may incorporate all files that have passed the verification process from baseline snapshot 302 to anomalous snapshot 310 into the final clean snapshot 164. In operation, data protection manager 154 may consider these files to be trustworthy and free from malicious tampering. For example, when data protection manager 154 identifies any files 330 as affected or compromised in the anomalous snapshot 310, data protection manager 154 may explicitly exclude these affected files from the final clean snapshot 164. This way data protection manager 154 may ensure that the reconstructed object is free from malicious elements.

Data protection manager 154 may prefer instances of files from more recent snapshots that are determined to be clean. Consequently, more recent versions of files are used to reconstruct clean snapshot 164.

Still referring to FIG. 3, the following example illustrates reconstruction of clean snapshot 164 by using files with file extensions. In this example, the anomalous snapshot 310 may be S[5] and the baseline snapshot 302 may be S[2]. Files may have the following extensions: .txt (text document), .doc (MICROSOFT WORD document), .pdf (portable document format), .jpg (JPEG image), .png (portable network graphics image), .xlsx (MICROSOFT EXCEL spreadsheet), .rar (compressed archive).

In the following example, baseline snapshot 302 (S[2]) contains the following files: a.txt, b.doc, c.pdf, d.jpg. All files in the baseline snapshot 302 are determined by data protection manager 154 to be clean at this point.

Snapshot S[3] contains all files from baseline snapshot 302 plus e.png. The file e.png is new, but data protection manager 154 may consider this file clean since this file does not show any anomalies or IOCs. Snapshot S[4] contains all files from S[3] plus f.xlsx. In this example, the file f.xlsx may be new but data protection manager 154 may consider this file to be clean. The anomalous snapshot 310 S[5] contains all files from S[4] plus g.rar.

The file g.rar may be new and data protection manger 154 may determine this file as compromised. The data protection manager 154 may now determine files c.pdf, e.png, and f.xlsx are compromised, even though they are clean in previous snapshots. This may suggest a potential data breach or modification.

Data protection manager 154 individually assesses each file 320 in the anomalous snapshot 310 for its integrity. Files confirmed as clean, either from the anomalous snapshot 310 itself or from previous snapshots 304-308, may be included in the final clean snapshot 164. In this example the final clean snapshot 164 may include the following clean files: {a.txt, b.doc, c.pdf, d.jpg, e.png, f.xlsx}. a.txt and b.doc are taken from snapshot S[5], g.rar is excluded from the clean snapshot, and c.pdf, d.jpg, e.png, and f.xlsx are taken from snapshot S[4], which is more recent that S[3]. Files identified as compromised, such as newly introduced files with malicious content or files that have been altered, and for which no clean version for the file exists, may be excluded as with g.rar in the above example. The disclosed techniques involve moving backward through snapshots 302-310 to verify file integrity, ensuring that the final clean snapshot 164 is free from contamination. By examining each file individually, data protection manager 154 may reduce the risk of including compromised data.

While time-consuming, the disclosed techniques may be optimized through automation and prioritization of critical files. The backward analysis may strengthen the confidence in the integrity of the final clean snapshot 164.

FIG. 4 is a flowchart illustrating example operation of a data protection manager in performing various aspects of construction of a clean snapshot, in accordance with techniques of this disclosure. For instance, data security model of ML models 163, as shown in the example of FIG. 4, may determine if the current snapshot contains anomalies (402).

If anomalies exist (decision block 402, yes branch), data security model 163 may send information about detected anomalies to data protection manager 154. Data protection manager 154 may locate the most recent clean snapshot (404) (e.g., baseline snapshot 302). As described above, data protection manager 154 may identify file differences between the clean and anomalous snapshots (406). The term "anomalous snapshot," as used herein refers to a snapshot containing suspicious or corrupted files. Data protection manager 154 may remove files present only in the baseline snapshot 141 (408). In some examples, data protection manager 154 may add clean files from the anomalous snapshot to clean snapshot 164 in clean room 167 (410). As used herein, the term "clean snapshot," refers to a snapshot free from anomalies or malicious content. For example, data protection manager 154 may check for clean files in previous snapshots (412), as described above. When data protection manager 154 finds clean files (decision block 414, yes branch), data protection manager 154 may add them to the clean snapshot 164 (410). As used herein, the term "clean files," refers to files determined to be free from anomalies.

Data protection manager 154 may continue the process 420 until all retrievable clean files are identified (decision block 416) and added to the clean snapshot 164. As described above, clean snapshot 164 may be reconstructed in clean room 167 environment.

Currently, users face challenges when configuring clean rooms 167 due to complex user interfaces, convoluted business processes and extensive documentation. Navigating intricate systems may be time-consuming and error prone. Understanding the steps and requirements may be overwhelming. Users often need to refer to manuals or tutorials to complete tasks.

According to techniques of the present invention, interface 226 may improve this process by automating configuration, simplifying interactions, eliminating context switching, and providing guidance. Interface 226 may handle essentially all the technical aspects of setting up clean room 167. As such, users may interact with interface 226 using natural language, providing instructions and preferences. Interface 226 may manage multiple tasks and configurations without requiring user intervention. Interface 226 may offer suggestions and recommendations based on user needs. Tasks may be completed faster with less effort. The process may become more intuitive and user-friendly. Automation may reduce human error. Users may focus on core tasks instead of configuration.

Figure 5:
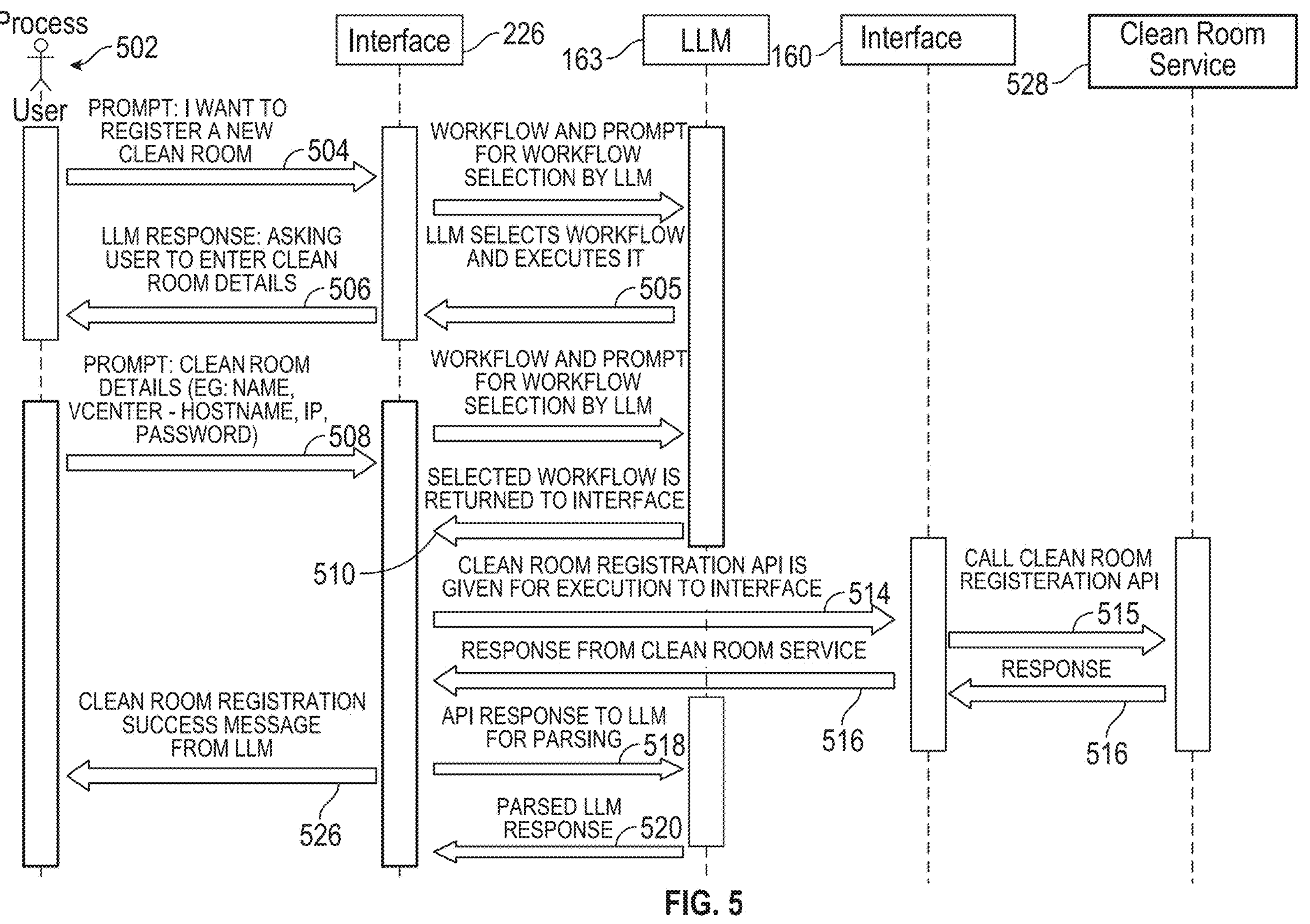
FIG. 5 is a use case diagram illustrating clean room configuration using an AI interface, in accordance with techniques of this disclosure.

FIG. 5 is a use case diagram illustrating clean room configuration using AI interface, in accordance with techniques of this disclosure.

As described above, an AI bot may be implemented in data platform 150 in the form of interface 226 and may be referred to as interface 226. When a user 502 attempts to access information about or initiate a recovery for a clean room, and no clean room is currently registered, data protection manager 154 may first prompt 506 for clean room details. Data protection manager 154 may request 506 clean room configuration information from the user 502. The clean room configuration information may include, but is not limited to: the address of the data platform 150, the password for accessing the data platform 150, the desired name for the clean room 167, etc.

The user 502 may provide 508 the requested details. Data protection manager 154 may utilize the provided credentials to make necessary API calls 514 to the services 165 to register the clean room 167. If the user 502 originally requested clean room details, data protection manager 154 may provide the newly registered clean room information 526. In some examples, if the user 502 initiated a recovery request, data protection manager 154 to proceed with the recovery process using the registered clean room 167. The disclosed technique is designed to be simple and intuitive for the user.

Data protection manager 154 may request only the necessary details to register the clean room 167. Data protection manager 154 may interact with the interface 160 and service(s) 165 environments to complete the registration. In some examples, the actions of data protection manager 154 may depend on the initial query 504 of the user 502.

When user 502 interacts with data protection manager 154, it may be possible that multiple clean rooms 167 are already registered. Data protection manager 154 should be able to handle these scenarios effectively. If there is only one registered clean room 167, data protection manager 154 may provide 526 details of clean room 167 directly.

If multiple clean rooms 167 exist, data protection manager 154 may present a list of available clean rooms 167 and may allow the user 502 to select one for details. If there is only one registered clean room 167, the recovery process may start automatically using that clean room 167. If no clean rooms 167 are configured, data protection manager 154 may prompt the user to register a new one before initiating recovery.

Users 502 may have the option to select a specific clean room 167 when multiple options are available. Data protection manager 154 may provide clear instructions and options to the user 502. The option to register a new clean room 167 may always be accessible to user 502.

In some examples, user 502 may request the deletion of a specific clean room 167 by providing its name to the data protection manager 154.

Data protection manager 154 may confirm the request of the user 502 to delete the specified clean room 167. This step may be important to prevent accidental deletion. Data protection manager 154 may initiate the deletion process, which may involve removing the clean room 167 from the records of the data platform 150 and potentially deleting associated data (depending on the specific implementation). Data protection manager 154 may inform the user 502 that the clean room 167 has been successfully deleted.

Referring back to FIG. 5, the flow diagram outlines the disclosed techniques for registering a new clean room. Interface 226 may be the interface where the user 502 interacts with data protection manager 154. The LLM (Large Language Model) 163 may handle user interactions, processes requests, and may generate responses. Interface 160 may be responsible for clean room management. The clean room service 528 may be a specific service or module within the services 165 for handling clean room 167 operations.

The disclosed techniques for registering new clean room 167 using an interface 226 and a language model may begin with a user request 504 to register a new clean room 167. By sending request 504, user 502 may express the desire to register a new clean room 167 through the interface 226. LLM 163 may analyze the query 504 and may select the appropriate workflow 505 for registering a clean room 167. In some examples, LLM 163 may prompt 506 user 502 to provide registration details like the clean room name, hostname, and password.

The collected user input may be processed and prepared for the next step. The LLM 163 may determine which APIs may be necessary for registering the clean room 167 based on the provided details. In some examples, LLM 163 may handle user interactions, workflow selection, and API determination. Interface 226 may process the response 510 from LLM 163 containing the selected workflow and may determine the necessary actions, including, but not limited to, identifying required API calls and correlating user input with API parameters. Interface 226 may pass the extracted information to Interface 160 via an API call 514. Interface 160 may be responsible for handling the API interactions. Interface 160 may make the necessary API calls to the relevant service (e.g., clean room service 528) to create the clean room 167. The clean room service 528 may process the registration request, may create a new clean room record, and may return a response 516. Interface 160 may wait for the API response 516, which may include the status of the registration process. As shown in FIG. 5, the API response 516 may be fed back to LLM 163 via interface 226. The LLM 163 may receive the response for parsing from the interface 226, may parse the received response 520, and may provide a message 526 to the user 502, informing them of the success or failure of the registration. Accordingly, in some examples, LLM 163 may handle user interactions, may determine the required actions, and may generate the final response 526 to the user 502.

Interface 160 may manage the technical aspects of interacting with services 165 and/or external systems through APIs. LLM 163 may focus on natural language understanding and user interaction, while Interface 160 may handle the technical execution. This architecture may allow for easier integration of different APIs and systems. Interface 160 may handle multiple API calls concurrently, improving performance.

According to techniques of the present invention, data protection manager 154 may be configured to determine the criticality of virtual machines (VMs) based on collected data points such as, but not limited to, file extensions, backup frequency, security tags, and data read/write patterns. During data collection, data protection manager 154 may gather relevant data points from VMs. Data protection manager 154 may derive insights from the collected data to assess VM criticality. Data protection manager 154 may create a machine learning model to improve prediction accuracy. Data protection manager 154 may incorporate user feedback to refine the model. Data protection manager 154 may gather data points from VMs, including, but not limited to, file extensions, backup frequency, data read/write volumes, and security tags. Data protection manager 154 may analyze the collected data to identify patterns and correlations. Data protection manager 154 may use simple rules or heuristics to determine initial VM criticality levels. For example, frequent backups, high data activity, and sensitive data may indicate high criticality. On the other hand, infrequent backups, low data activity, and no sensitive data may indicate low criticality. In other words, if a VM backup is taken frequently with significant data read and written, or if the security tags indicate that the VM contains highly sensitive data, data protection manager 154 may infer that the VM is highly critical due to usage pattern of the VM and due to the nature of file contents of the VM. The reasoning provided by data protection manager 154 may emphasize the frequent backups and highly sensitive data. On the other hand, if a VM backup is taken infrequently and the security tags indicate no sensitive data is present, data protection manager 154 may infer that the VM has low usage and contains less important documents. The insight provided by data protection manager 154 (e.g., LLM 163) may highlight the low criticality, detailing the lack of sensitive data. According to techniques of the present invention, data protection manager 154 may create a machine learning model using a supervised learning technique. Data protection manager 154 may train the model on the collected data, using VM criticality as the target variable. Data protection manager 154 may employ a feedback mechanism to allow the model to learn from user corrections and improve accuracy over time. Data protection manager 154 may incorporate customer feedback to refine the model and adapt to different usage patterns. Data protection manager 154 may use feedback to identify areas where the model is inaccurate and make necessary adjustments. Accurate VM criticality assessment may help prioritize backups, disaster recovery planning, and resource allocation. Identifying critical VMs may help data protection manager 154 to focus security efforts on high-value assets. By understanding VM importance, organizations may optimize resource utilization and reduce costs.

According to techniques of the present invention, data protection manager 154 may gather customer feedback on VM criticality levels (Low, Medium, High). Data protection manager 154 may store this feedback in a knowledgebase 166 for analysis and model improvement. Data protection manager 154 may utilize existing data points (file extensions, backup frequency, data read/written) with the predicted criticality levels generated by the VM criticality model 163. This combined dataset may serve as the training data for the improved model. Data protection manager 154 may use the existing supervised VM criticality model 163 to predict the criticality of a VM or data source based on the collected data points. Data protection manager 154 may pass the VM details, predicted criticality, and original data points to LLM 163 for generating insights. LLM 163 may analyze the provided information and may generate human-readable insights into the criticality of the VM. Data protection manager 154 may present the predicted criticality, generated insights, and original data points to user 502. Data protection manager 154 may use the feedback of user 502 to correct the predictions of the VM criticality model 163 and improve accuracy of the model over time. Incorporating customer feedback may enhance the ability of VM criticality model 163 to accurately assess VM criticality. LLM 163 may provide valuable insights into the reasoning of VM criticality model 163, improving transparency. The feedback loop may ensure that VM criticality model 163 may adapt to changing conditions and customer requirements.

Figure 6A:
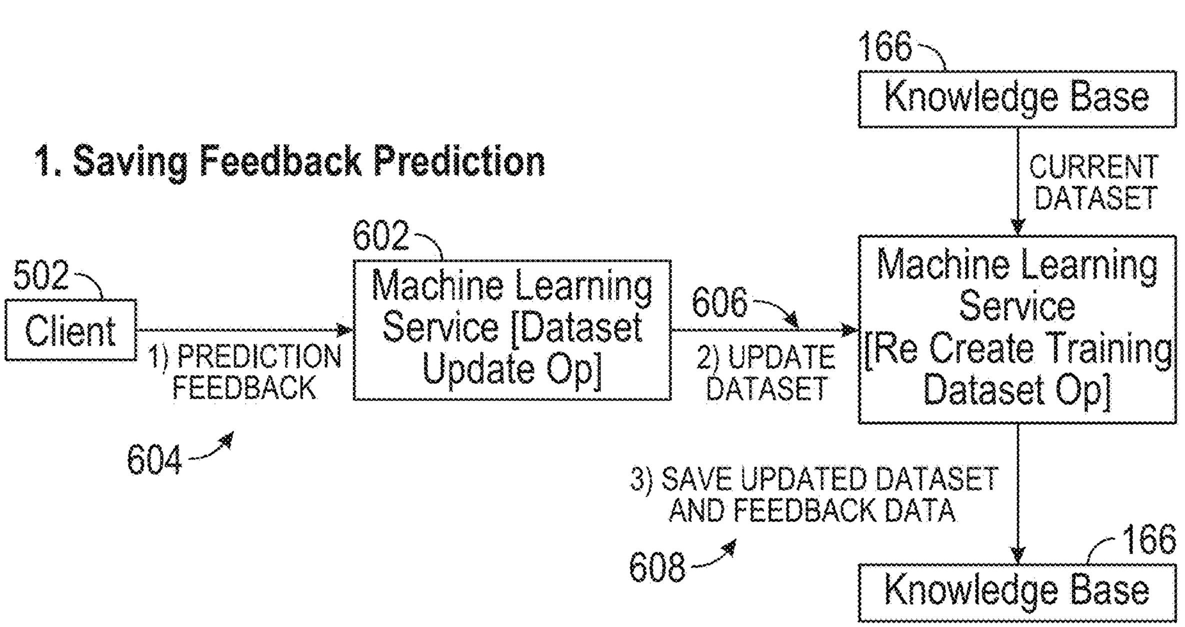
FIG. 6A-6C are flowcharts illustrating example techniques for continuously improving a VM criticality machine learning model through a feedback loop, in accordance with techniques of this disclosure.
Figure 6B:
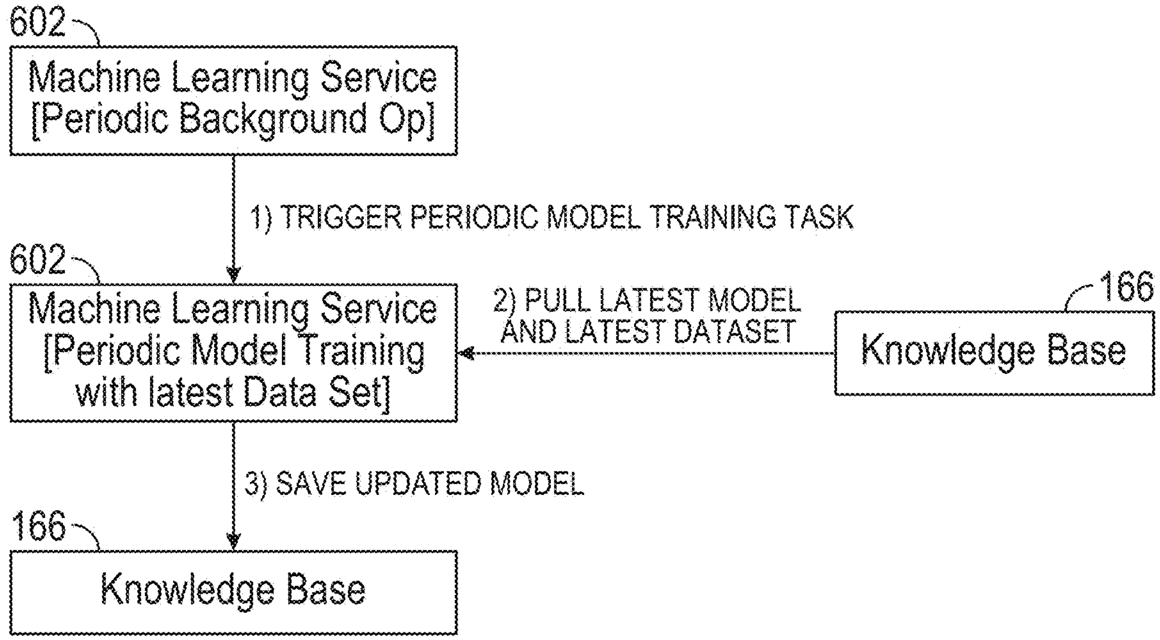
Figure 6C:
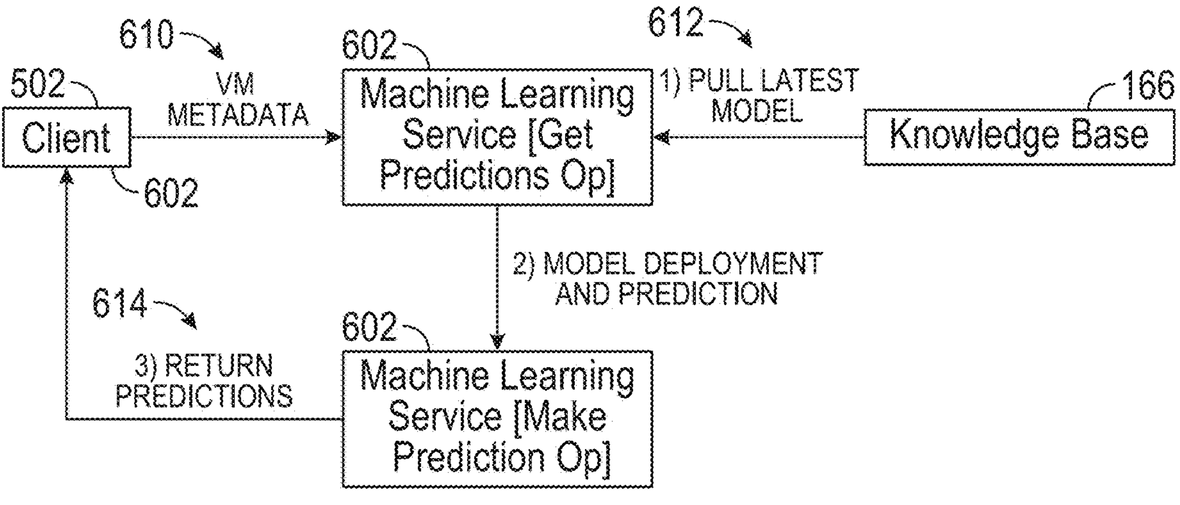

FIG. 6A-6C are flowcharts illustrating example techniques for continuously improving a VM criticality machine learning model through a feedback loop, in accordance with techniques of this disclosure. Knowledge base 166 (e.g., VM criticality knowledge base) may store the current dataset and updated dataset. Machine learning service 602 may be a service provided by services 165 may be responsible for training, deploying, and making predictions using VM criticality model 163. Client 502 may represent the user or application interacting with data platform 150. In some examples, client 502 may represent data protection manager 154. In some examples, during or prior to data recovery (e.g., ransomware recovery) described above, data protection manager 154 may send data to machine learning service 602 for prediction. For example, as shown in FIG. 6A, client 502 may provide feedback 604 on the accuracy of the machine learning prediction. The client 502 may send the prediction feedback data 604 to machine learning service 602. Machine learning service 602 may update 606 the dataset with the new information. Machine learning service 602 may periodically retrain the VM criticality model 163 using the updated dataset. Machine learning service 602 may save the new dataset to the knowledge base 166. The machine learning service 602 may use the trained VM criticality model 163 to make predictions for new data. Data protection manager 154 may constantly improve VM criticality model 163 by incorporating new data and feedback. The knowledge base 166 may efficiently store and manage the dataset. In some examples, machine learning service 602 may handle model training, deployment, and prediction.

During data collection phase, data protection manager 154 may gather relevant data points about VMs, such as, but not limited to, VM snapshot metadata (files changed, bytes written, etc.), file extensions, backup frequency, data read/write patterns, and existing tags. The VM criticality model 163 may serve as a baseline for assessing VM importance. In some examples, data protection manager 154 may allow users 502 to provide feedback on the predictions of VM criticality model 163 through interface 226. Data protection manager 154 may update the training and validation datasets with the new feedback data via machine learning service 602, as shown in FIG. 6A.

As shown in FIG. 6B, data protection manager 154 may also employ machine learning service 602 to regularly retrain VM criticality model 163 with the updated dataset. Data may serve as the foundation for VM criticality model 163 and may be continuously enriched with user feedback. VM criticality model 163 may predict VM criticality, as shown in FIG. 6C and may be refined through the feedback loop. Interface 226 may enable users to provide feedback on the predictions of the VM criticality model 163. The feedback loop may ensure continuous improvement of VM criticality model 163 by incorporating user input.

Referring now to FIG. 6C, in some examples, data protection manager 154 may gather relevant VM snapshot metadata (files changed, bytes written, etc.) and may send 610 the collected data to machine learning (ML) service 602 for analysis. In some examples, the ML service 602 may fetch 612 the latest trained VM criticality model 163 from the knowledge base 166. ML service 602 may apply VM criticality model 163 to the provided metadata, generating a criticality prediction. The prediction result may be sent back 614 to the client 502 for further action. Data protection manager 154 may continuously collect user feedback on the predictions of VM criticality model 163. The feedback may be used to update the training dataset and retrain VM criticality model 163. This iterative process may ensure VM criticality model 163 adapts to changing data patterns and may improve accuracy over time. In some examples, data protection manager 154 may employ LLM 163 to provide detailed insights based on the predicted criticality level. The LLM 163 may analyze the VM snapshot metadata 610 and criticality assessment to generate human-readable explanations. The user 502 may receive the predicted criticality level and generated insights. Data protection manager 154 may collect VM snapshot metadata 610 and may receive prediction results 610 and insights. The ML service 602 may manage model training, deployment, and prediction generation. In some examples, the knowledge base 166 may store VM criticality model 163, training data, and feedback data. The LLM 163 may provide valuable insights. In some examples, data protection manager 154 may utilize actionable information provided by ML service 602 to manage data restoration process (e.g., ransomware restoration).

Figure 7:
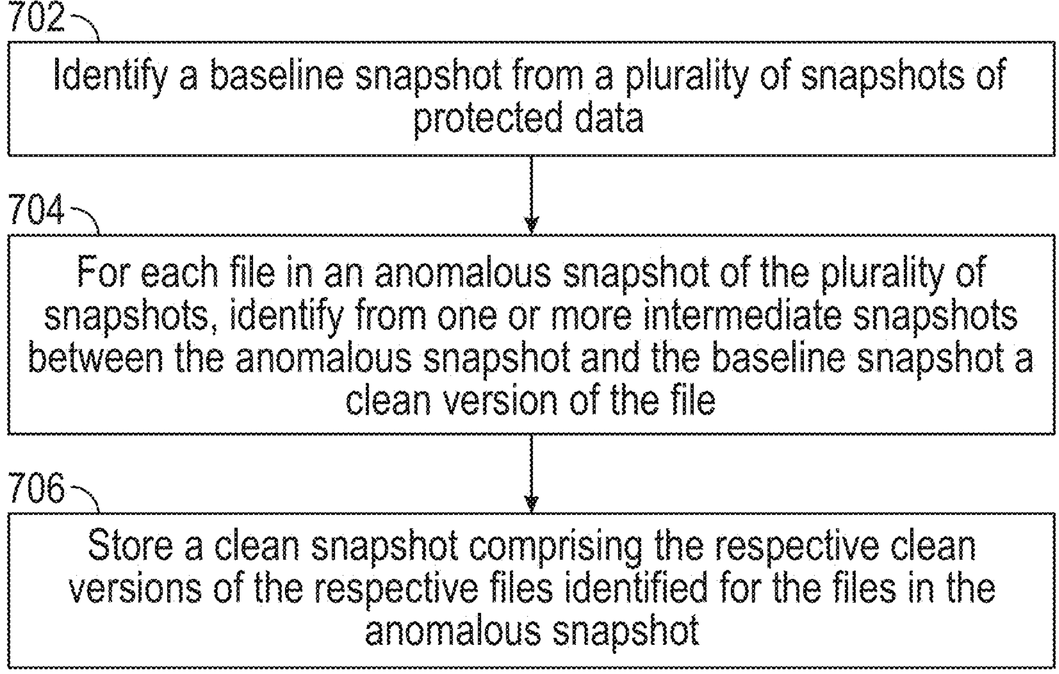
FIG. 7 is a flowchart illustrating a mode of operation for malware recovery, in accordance with techniques of this disclosure.

FIG. 7 is a flowchart illustrating a mode of operation for malware recovery, in accordance with techniques of this disclosure. Some aspects of FIG. 7 may be described in the context of FIGS. 1A-1B and FIGS. 2-3. Data platform 150, such as through data protection manager 154, may identify a baseline snapshot from a plurality of snapshots of protected data (702). The baseline snapshot may include one or more files that each exhibits no indication of compromise. As described above in conjunction with FIG. 3, this step may involve a backward-looking analysis of snapshots from anomalous snapshot 310 to pinpoint a clean starting point (baseline snapshot 302). For each file in an anomalous snapshot of the plurality of snapshots, data protection manager 154 may identify from one or more intermediate snapshots between the anomalous snapshot and the baseline snapshot in the plurality of snapshots, a clean version of the file (704). The term "anomalous snapshot," as used herein refers to a snapshot containing suspicious or corrupted files. Files confirmed as clean, either from the anomalous snapshot 310 itself or from previous snapshots 304-308, may be included in the final clean snapshot 164. Data protection manager 154 may store a clean snapshot comprising the respective clean versions of the respective files identified for the files in the anomalous snapshot (706). The disclosed techniques may be more precise than restoring entire snapshots 142, as the disclosed techniques avoid reintroduction of compromised data.

Although the techniques described in this disclosure are primarily described with respect to a backup or snapshot function performed by a data protection manager of a data platform, similar techniques may additionally or alternatively be applied for an archive, replica, or clone function performed by the data platform. In such cases, snapshots 142 would be archives, replicas, or clones, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

Aspects of this disclosure include the following examples.

Example 1: A method includes identifying, by a data platform implemented by a computing system, a baseline snapshot from a plurality of snapshots of protected data, wherein the baseline snapshot comprises one or more files that each exhibits no indication of compromise; for each file in an anomalous snapshot of the plurality of snapshots, identifying, by the data platform, from one or more intermediate snapshots between the anomalous snapshot and the baseline snapshot in the plurality of snapshots, a clean version of the file; and storing, by the data platform, a clean snapshot comprising the respective clean versions of the respective files identified for the files in the anomalous snapshot.

Example 2. The method of example 1, wherein the anomalous snapshot is compromised by malware, the method further comprising: analyzing, by the data platform and using one or more machine learning models, one or more of: the malware or a type of data affected by the malware.

Example 3. The method of example 1, wherein the anomalous snapshot comprises a most recent snapshot determined to be compromised.

Example 4. The method of any of examples 1 through 3, wherein identifying the clean version of the file comprises identifying, in a secure environment, the clean version of the file.

Example 5. The method of example 4, further comprising: obtaining, by one or more machine learning models of the data platform, using a natural language, registration information related to the secure environment; and initiating, by the one or more machine learning models, a registration process for the secure environment.

Example 6. The method of any of examples 1 through 5, further comprising: training, by the data platform, the one or more machine learning models with a data set including at least a secure environment knowledge base.

Example 7. The method of any of examples 1 through 6, further comprising: deleting, by the one or more machine learning models of the data platform, the secure environment in response to receiving a delete request from a user.

Example 8. The method of any of examples 1 through 7, further comprising: restoring, by the data platform, based on the clean snapshot, at least a portion of the protected data.

Example 9. The method of any of examples 1 through 8, wherein the protected data comprises a first application workload, the method further comprising: predicting, by one or more machine learning models of the data platform, criticality of the first application workload; obtaining, by the data platform, user feedback indicative of accuracy of the criticality prediction; and providing, by the data platform, the user feedback to the one or more machine learning models to generate revised one or more machine learning models.

Example 10. The method of example 9, wherein the protected data comprises a second application workload, the method further comprising: predicting, by the revised one or more machine learning models of the data platform, criticality of the second application workload, wherein the revised one or more machine learning models incorporate the user feedback indicative of accuracy of the criticality prediction of the first application workload into a prediction of the criticality of the second application workload.

Example 11. The method of any of examples 1 through 10, wherein for each file in the anomalous snapshot, identifying the clean file comprises: iterating through the one or more intermediate snapshots and, when a corresponding file for the file in the anomalous snapshot exists in one of the intermediate snapshot, verifying an integrity of the corresponding file.

Example 12. The method of any of examples 1 through 11, wherein the baseline snapshot does not include any files that exhibit an indication of compromise.

Example 13. A computing system comprising: a memory storing instructions; and processing circuitry that executes the instructions to: identify a baseline snapshot from a plurality of snapshots of protected data, wherein the baseline snapshot comprises one or more files that each exhibits no indication of compromise; for each file in an anomalous snapshot of the plurality of snapshots, identify from one or more intermediate snapshots between the anomalous snapshot and the baseline snapshot in the plurality of snapshots, a clean version of the file; and store a clean snapshot comprising the respective clean versions of the respective files identified for the files in the anomalous snapshot.

Example 14. The computing system of example 13, wherein the anomalous snapshot is compromised by malware, and the processing circuitry further executes the instructions to: analyze, using one or more machine learning models, one or more of: the malware or a type of data affected by the malware.

Example 15. The computing system of example 13, wherein the anomalous snapshot comprises a most recent snapshot determined to be compromised.

Example 16. The computing system of any of examples 13 through 15, wherein identifying the clean version of the file comprises identifying, in a secure environment, the clean version of the file.

Example 17. The computing system of example 16, wherein the processing circuitry further executes the instructions to: obtain, by one or more machine learning models, using a natural language, registration information related to the secure environment; and initiate, by the one or more machine learning models, a registration process for the secure environment.

Example 18. The computing system of any of examples 13 through 17, wherein the processing circuitry further executes the instructions to: train the one or more machine learning models with a data set including at least a secure environment knowledge base.

Example 19. The computing system of any of examples 13 through 18, wherein the processing circuitry further executes the instructions to: delete, by the one or more machine learning models, the secure environment in response to receiving a delete request from a user.

Example 20. Non-transitory computer-readable media comprising instructions that, when executed, cause processing circuitry of a computing system to: identify a baseline snapshot from a plurality of snapshots of protected data, wherein the baseline snapshot comprises one or more files that each exhibits no indication of compromise; for each file in an anomalous snapshot of the plurality of snapshots, identify from one or more intermediate snapshots between the anomalous snapshot and the baseline snapshot in the plurality of snapshots, a clean version of the file; and store a clean snapshot comprising the respective clean versions of the respective files identified for the files in the anomalous snapshot.

Various examples of the disclosure have been described. Any combination of the described systems, operations, or functions is contemplated.

The invention claimed is:

1. A method comprising:

identifying, by a data platform implemented by a computing system, a baseline snapshot from a plurality of snapshots of protected data, wherein the baseline snapshot comprises one or more files that each exhibits no indication of compromise;

for each file in an anomalous snapshot of the plurality of snapshots, identifying, by the data platform, in a secure environment, from one or more intermediate snapshots between the anomalous snapshot and the baseline snapshot in the plurality of snapshots, a clean version of the file;

storing, by the data platform, a clean snapshot comprising the respective clean versions of the respective files identified for the files in the anomalous snapshot;

obtaining, by one or more machine learning models of the data platform, using a natural language, registration information related to the secure environment; and initiating, by the data platform using the registration information, a registration process for the secure environment.

2. The method of claim 1, wherein the anomalous snapshot is compromised by malware, the method further comprising:

analyzing, by the data platform and using one or more machine learning models, one or more of: the malware or a type of data affected by the malware.

3. The method of claim 1, wherein the anomalous snapshot comprises a most recent snapshot determined to be compromised.

4. The method of claim 1, further comprising:

training, by the data platform, the one or more machine learning models with a data set including at least a secure environment knowledge base.

5. The method of claim 1, further comprising:

deleting, by the data platform, the secure environment in response to receiving a delete request from a user.

6. The method of claim 1, further comprising:

restoring, by the data platform, based on the clean snapshot, at least a portion of the protected data.

7. The method of claim 1, wherein the protected data comprises a first application workload, the method further comprising:

predicting, by one or more machine learning models of the data platform, criticality of the first application workload;

obtaining, by the data platform, user feedback indicative of accuracy of the criticality prediction; and providing, by the data platform, the user feedback to the one or more machine learning models to generate revised one or more machine learning models.

8. The method of claim 7, wherein the protected data comprises a second application workload, the method further comprising:

predicting, by the revised one or more machine learning models of the data platform, criticality of the second application workload, wherein the revised one or more machine learning models incorporate the user feedback indicative of accuracy of the criticality prediction of the first application workload into a prediction of the criticality of the second application workload.

9. The method of claim 1, wherein for each file in the anomalous snapshot, identifying the clean file comprises:

iterating through the one or more intermediate snapshots and, when a corresponding file for the file in the anomalous snapshot exists in one of the intermediate snapshot, verifying an integrity of the corresponding file.

10. The method of claim 1, wherein the baseline snapshot does not include any files that exhibit an indication of compromise.

11. A computing system comprising:

a memory storing instructions; and processing circuitry that executes the instructions to:

identify a baseline snapshot from a plurality of snapshots of protected data, wherein the baseline snapshot comprises one or more files that each exhibits no indication of compromise;

for each file in an anomalous snapshot of the plurality of snapshots, identify, in a secure environment, from one or more intermediate snapshots between the anomalous snapshot and the baseline snapshot in the plurality of snapshots, a clean version of the file;

store a clean snapshot comprising the respective clean versions of the respective files identified for the files in the anomalous snapshot;

obtain, by one or more machine learning models, using a natural language, registration information related to the secure environment; and initiate, using the registration information, a registration process for the secure environment.

12. The computing system of claim 11, wherein the anomalous snapshot is compromised by malware, and the processing circuitry further executes the instructions to:

analyze, using one or more machine learning models, one or more of: the malware or a type of data affected by the malware.

13. The computing system of claim 11, wherein the anomalous snapshot comprises a most recent snapshot determined to be compromised.

14. The computing system of claim 11, wherein the processing circuitry further executes the instructions to:

train the one or more machine learning models with a data set including at least a secure environment knowledge base.

15. The computing system of claim 11, wherein the processing circuitry further executes the instructions to:

delete the secure environment in response to receiving a delete request from a user.

16. Non-transitory computer-readable media comprising instructions that, when executed, cause processing circuitry of a computing system to:

identify a baseline snapshot from a plurality of snapshots of protected data, wherein the baseline snapshot comprises one or more files that each exhibits no indication of compromise;

for each file in an anomalous snapshot of the plurality of snapshots, identify, in a secure environment, from one or more intermediate snapshots between the anomalous snapshot and the baseline snapshot in the plurality of snapshots, a clean version of the file;

store a clean snapshot comprising the respective clean versions of the respective files identified for the files in the anomalous snapshot;

obtain, by one or more machine learning models, using a natural language, registration information related to the secure environment; and initiate, by the data platform using the registration information, a registration process for the secure environment.

* * * * *